United States Patent
Jeong et al.

(10) Patent No.: US 9,043,547 B2
(45) Date of Patent: May 26, 2015

(54) VIRTUALIZED DATA STORAGE IN A NETWORK COMPUTING ENVIRONMENT

(71) Applicant: NetApp, Inc., Sunnyvale, CA (US)

(72) Inventors: Wayland Jeong, Agoura Hills, CA (US); Mukul Kotwani, Woodland Hills, CA (US); Vladimir Popovski, Irvine, CA (US)

(73) Assignee: NetApp, Inc, Sunnyvale, CA (US)

(*) Notice: Subject to any disclaimer, the term of this patent is extended or adjusted under 35 U.S.C. 154(b) by 0 days.

(21) Appl. No.: 14/218,308

(22) Filed: Mar. 18, 2014

(65) Prior Publication Data
US 2014/0201312 A1 Jul. 17, 2014

Related U.S. Application Data

(63) Continuation of application No. 13/960,189, filed on Aug. 6, 2013, now Pat. No. 8,756,373, which is a continuation of application No. 12/506,143, filed on Jul. 20, 2009, now Pat. No. 8,527,697.

(51) Int. Cl.
| | |
|---|---|
| *G06F 12/00* | (2006.01) |
| *G06F 3/06* | (2006.01) |
| *G06F 12/10* | (2006.01) |
| *G06F 12/08* | (2006.01) |

(52) U.S. Cl.
CPC ............ *G06F 3/0689* (2013.01); *G06F 12/109* (2013.01); *G06F 12/08* (2013.01); *G06F 3/061* (2013.01); *G06F 3/0635* (2013.01); *G06F 3/067* (2013.01)

(58) Field of Classification Search
CPC ..... G06F 3/0689; G06F 12/109; G06F 12/08; G06F 3/067; G06F 3/0635
USPC .................................................. 711/114, 203
See application file for complete search history.

(56) References Cited

U.S. PATENT DOCUMENTS

| | | | |
|---|---|---|---|
| 5,784,707 A | 7/1998 | Khalidi et al. | |
| 6,026,475 A * | 2/2000 | Woodman | 711/202 |
| 6,243,794 B1 * | 6/2001 | Casamatta | 711/153 |
| 6,519,678 B1 | 2/2003 | Basham et al. | |
| 7,383,381 B1 | 6/2008 | Faulkner | |

(Continued)

OTHER PUBLICATIONS

Patel, "Storage File Mapping in databases," Apr. 2003, Veritas Architect Network.

(Continued)

*Primary Examiner* — Jae Yu
(74) *Attorney, Agent, or Firm* — Haynes and Boone, LLP

(57) ABSTRACT

Methods and systems for load balancing read/write requests of a virtualized storage system. In one embodiment, a storage system includes a plurality of physical storage devices and a storage module operable within a communication network to present the plurality of physical storage devices as a virtual storage device to a plurality of network computing elements that are coupled to the communication network. The virtual storage device comprises a plurality of virtual storage volumes, wherein each virtual storage volume is communicatively coupled to the physical storage devices via the storage module. The storage module comprises maps that are used to route read/write requests from the network computing elements to the virtual storage volumes. Each map links read/write requests from at least one network computing element to a respective virtual storage volume within the virtual storage device.

18 Claims, 6 Drawing Sheets

(56) References Cited

U.S. PATENT DOCUMENTS

| | | |
|---|---|---|
| 7,428,614 B2 | 9/2008 | Murase |
| 7,437,506 B1 | 10/2008 | Kumar et al. |
| 7,769,842 B2 | 8/2010 | Weber |
| 8,527,697 B2 | 9/2013 | Jeong et al. |
| 2003/0041210 A1 | 2/2003 | Keays |
| 2003/0191916 A1* | 10/2003 | McBrearty et al. ........... 711/162 |
| 2003/0236945 A1 | 12/2003 | Nahum |
| 2005/0044301 A1 | 2/2005 | Vasilevsky et al. |
| 2005/0080992 A1 | 4/2005 | Massey |
| 2006/0053250 A1 | 3/2006 | Saze |
| 2007/0016754 A1 | 1/2007 | Testardi |
| 2007/0033343 A1 | 2/2007 | Iida |
| 2008/0028143 A1 | 1/2008 | Murase |
| 2008/0209123 A1 | 8/2008 | Iida |
| 2008/0313301 A1 | 12/2008 | Jewett |
| 2008/0320134 A1 | 12/2008 | Edsall |
| 2009/0024752 A1 | 1/2009 | Shitomi |
| 2009/0055507 A1 | 2/2009 | Oeda |
| 2009/0089395 A1 | 4/2009 | Fen et al. |
| 2009/0106766 A1 | 4/2009 | Masuda |
| 2013/0318309 A1 | 11/2013 | Jeong et al. |

OTHER PUBLICATIONS

Office Action dated Feb. 21, 2012 in parent application, U.S. Appl. No. 12/506,143.
Final Office Action dated Jul. 31, 2012 in parent application, U.S. Appl. No. 12/506,143.
Office Action dated Nov. 15, 2012 in parent application, U.S. Appl. No. 12/506,143.

* cited by examiner

VIRTUALIZED DATA STORAGE IN A NETWORK COMPUTING ENVIRONMENT

REFERENCE TO RELATED APPLICATIONS

This application is a continuation of U.S. patent application Ser. No. 13/960,189, filed on Aug. 6, 2013, which is a continuation of U.S. Pat. No. 8,527,697, filed on Jul. 20, 2009, both of which are hereby incorporated by reference in their entirety.

BACKGROUND

1. Field of the Invention

The invention relates generally to network storage systems and more specifically to virtualized storage systems in a computer network.

2. Discussion of Related Art

A typical large-scale storage system (e.g., an enterprise storage system) includes many diverse storage resources, including storage subsystems and storage networks. Many contemporary storage systems also control data storage and create backup copies of stored data where necessary. Such storage management generally results in the creation of one or more logical volumes where the data in each volume is manipulated as a single unit. In some instances, the volumes are managed as a single unit through a technique called "storage virtualization".

Storage virtualization allows the storage capacity that is physically spread throughout an enterprise (i.e., throughout a plurality of storage devices) to be treated as a single logical pool of storage. Virtual access to this storage pool is made available by software that masks the details of the individual storage devices, their locations, and the manner of accessing them. Although an end user sees a single interface where all of the available storage appears as a single pool of local disk storage, the data may actually reside on different storage devices in different places. The data may even be moved to other storage devices without a user's knowledge.

Storage virtualization is commonly provided by a storage virtualization engine (SVE) that masks the details of the individual storage devices and their actual locations by mapping logical storage addresses to physical storage addresses. The SVE generally follows predefined rules concerning availability and performance levels and then decides where to store a given piece of data. Depending on the implementation, an SVE can be implemented by specialized hardware located between the host servers and the storage. Host server applications or file systems can then mount the logical volume without regard to the physical storage location or vendor type.

FIG. 1 illustrates a block diagram of a prior art storage virtualization system 100 in a network computing environment. With network based storage virtualization, an SVE 103 is linked to virtual volume exposures, or target ports 102-1 . . . N, that provide communications between network computing elements 101-1 . . . N (e.g., computers, servers, and/or other types of read/write request initiators) coupled to the network 110 and a physical storage volume 107. For example, the SVE 103 may attach to a network fabric to expose virtual storage volumes 106-1 . . . N appearing behind virtual storage end-points, also known as physical storage containers (PSCs) 105-1 . . . N. The virtual storage volumes 106-1 . . . N are essentially physical volume exposures that appear behind each PSC 105 are unique volume exposures capable of representing the same virtual volume metadata. Each of the exposures that share common metadata represents a different path to the same physical storage volume 107. In this regard, the SVE 103 does not actually provide storage; rather, it forwards read/write requests according to the virtual volume metadata or it maps the read/write requests to the appropriate physical storage location in the physical storage volume 107. Read/write requests are forwarded by the network computing elements 101-1 . . . N to access the virtual storage space.

Host multipathing software utilizes available paths to the virtual volumes 106-1 . . . N exposed by the SVE 103. The SVE 103 selects a single path to the physical volume 107 through a virtual extent 104 (e.g., as illustrated via PSC 105-2) and utilizes this path for all metadata references to the physical storage volume 107. In this regard, the metadata being represented by a map is indexed by the logical block address (LBA) of a virtual read/write request to yield the same backside path for all references to the physical volume 107. This form of static path selection, however, decreases performance since the data traverses a single path even though a plurality of paths are available (e.g., via PSCs 105-1, 105-3, 105-4, and 105-N).

Alternatively, the SVE 103 may aggregate the set of available paths and select a different path for each incoming read/write request using some sort of policy (e.g., via round-robin, least recently used, or bandwidth-based policies). Each read/write request that is routed to the physical storage volume 107 is thus dynamically spread across the available paths. Thus, if four paths to the virtual storage volumes 106 exist (e.g., four PSCs 105), a network computing element 101 can realize four times the bandwidth of a single network connection. This dynamic path selection, however, uses complex intelligence to perform read/write request forwarding, thereby impacting overall performance of the SVE 103. For example, the read/write request forwarding of the SVE 103 generally involves RISC-like processing. This performance is typically measured by the number of forwarding decisions made per second. Adding complex routing logic that is executed for each forwarded read/write request reduces the rate at which forwarding decisions can be made, thereby affecting access to the physical storage volume 107. Moreover, dynamic path selection generally employs state machine processing (e.g., bandwidth-based, last path used, etc.) to ensure a fair distribution of the read/write requests across the available paths, resulting in higher overhead/memory consumption that further impacts performance. Accordingly, there exists a need to provide load balancing in a virtualized storage system that does not substantially impact read/write request performance.

SUMMARY

The present invention solves the above and other problems, thereby advancing the state of the useful arts, by providing methods and systems for balancing read/write requests in a virtualized storage system. In one embodiment, a storage system includes a plurality of physical storage devices and a storage module (e.g., an SVE) operable within a communication network to present the plurality of physical storage devices as a virtual storage device to a plurality of network computing elements that are coupled to the communication network. The storage module may be generally referred to as a virtual storage module or as an SVE. The virtual storage device is configured as a plurality of virtual storage volumes such that the physical storage devices appear as a contiguous storage space. Each virtual storage volume is communicatively coupled to the physical storage devices via the storage module. The storage module includes maps that are used to route read/write requests from the network computing elements to the virtual storage volumes. Each map links read/ write requests from at least one network computing element to a respective virtual storage volume within the virtual storage device. In one embodiment, the maps index a virtual LBA to a physical LBA. Each such mapping is generally one-to-one and the SVE populates these maps such that the entire set of PSCs to the virtual storage volumes is used (e.g., not just according to a preferred path).

Each map may be operable to balance distribution of the read/write requests by handling a certain number of read/write requests. Such may be determined based on certain storage characteristics, such as path speed, number of requests from a particular read/write request initiator, etc. The storage module may include a plurality of virtual storage volume extents that correspondingly link to a plurality physical storage containers. In this regard, each physical storage container may link to a virtual storage volume. The storage module may be further operable to determine communication types of the read/write requests and process the read/write requests according to their respective communication types. For example, the read/write requests may be virtual read/write requests that are configured according to the particular storage command used by the initiating device. Examples of such include Fibre Channel, SAS, TCP/IP, SCSI, ISCSI, SCSI over Infiniband, etc.

In another embodiment, a method of balancing read/write requests within a virtualized storage system is presented. The virtualized storage system includes a network based virtual storage module (e.g., an SVE) that is operable to present a plurality of remotely located physical storage devices as a plurality of virtual storage volumes across a computing network. The method includes processing the read/write requests through a plurality of virtual target ports to access the virtual storage volumes and extracting storage access information from each read/write request. The method also includes linking the storage access information to the virtual storage module and accessing mapping information within the virtual storage module. The method further includes, for each extracted storage access information, accessing a virtual storage volume according to the mapping information. The mapping information is operable to ensure that access to the virtual storage volumes is evenly distributed through a plurality of physical storage containers.

In another embodiment, a storage virtualization software product operable within a network communication device is presented. The software product includes instructions that direct a processor of the network communication device to virtualize a physical storage volume into a plurality of virtual storage volumes and balance read/write requests to the virtual storage volumes. The physical storage volume is configured from a plurality of remotely located physical storage devices. The software product further includes instructions that direct the processor to process the read/write requests through a plurality of virtual target ports to access the virtual storage volumes, extract storage access information from each read/write request, and link the storage access information to the virtual storage module. The storage virtualization software product also includes instructions that direct to the processor to access mapping information within the virtual storage module and, for each extracted storage access information, access a virtual storage volume according to the mapping information. The mapping information is operable to ensure that access to the virtual storage volumes is evenly distributed through a plurality of physical storage containers.

In many instances, the drawings include multiple similar elements and are therefore labeled with the designations "1 . . . N" throughout the drawings and the specification. As used herein, the letter "N" simply refers to an integer greater than 1 that is not necessarily equating any number of elements to another number of elements.

DETAILED DESCRIPTION OF THE DRAWINGS

FIGS. 2-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
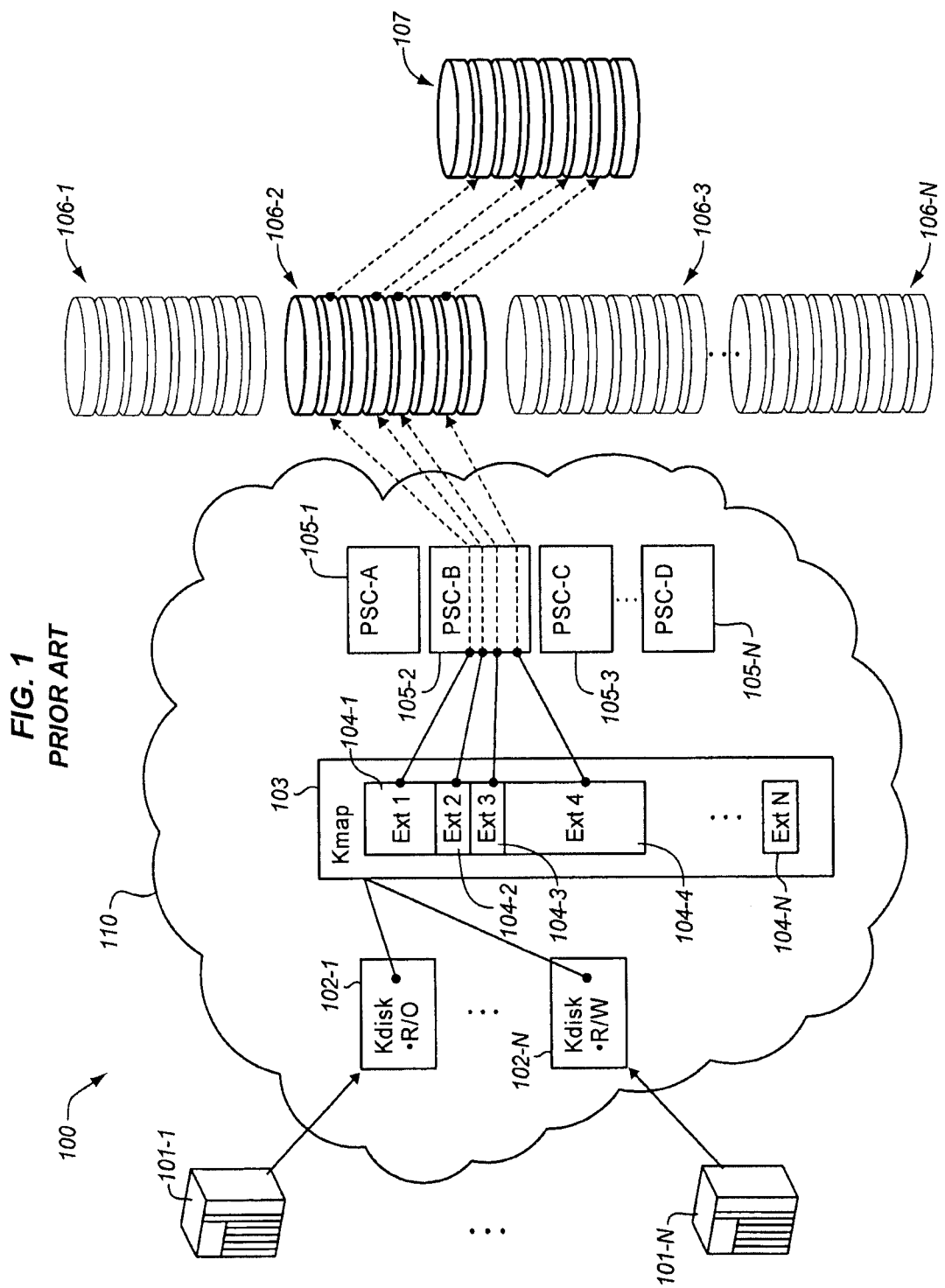
FIG. 1 is a block diagram of a prior art storage virtualization system.
Figure 2:
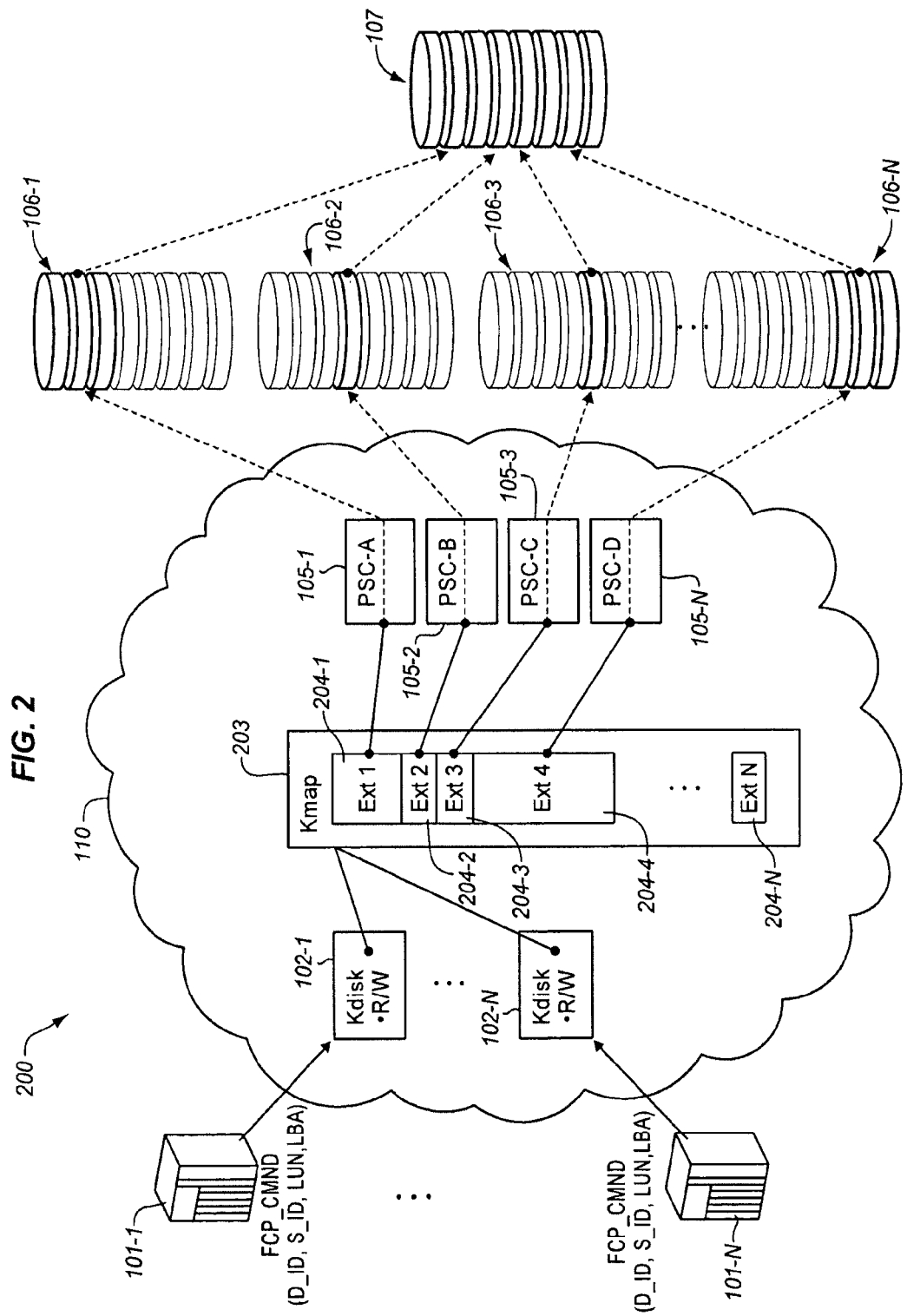
FIG. 2 is a block diagram of an exemplary storage virtualization system with load balancing.

FIG. 2 is a block diagram of an exemplary storage virtualization system 200 with load balancing. The storage virtualization system 200 includes an SVE 203, target ports 102-1 . . . N (e.g., "kdisks"), PSCs 105-1 . . . N, physical storage volume 107, and the virtual storage volumes 106-1 . . . N coupled thereto. The physical storage volume 107 is configured from a plurality of physical storage devices, such as disk drives, and virtualized into a plurality of virtual storage volumes 106-1 . . . N by the SVE 203. Assisting in this virtualization are the physical storage containers 105-1 . . . N which interface to the virtual storage volumes 106-1 . . . N of the physical storage volume 107. In essence, the virtual storage volumes 106-1 . . . N are physical extents of the physical storage volume 107 that are created by the SVE 203 through virtual extents 204-1 . . . N to provide a contiguous storage space.

For example, the target ports 102-1 . . . N may be configured from metadata that map the virtual extents 204-1 . . . N to one or more of the physical extents (i.e., the virtual storage volumes 106-1 . . . N). In this regard, the target ports 102-1 . . . N may include a physical initiator ID, a virtual target ID, and a virtual Logical Unit Number (LUN) to access the virtual storage volumes 106-1 . . . N via virtual read/write requests. The target ports 102-1 . . . N validate the read/write requests from the network computing elements 101-1 . . . N. The target ports 102-1 . . . N are linked to the SVE 203 to map the read/write requests into variable sized virtual extents 204-1 . . . N. These virtual extents 204-1 . . . N may also be configured from metadata that allows the SVE 203 to be indexed by the logical block address (LBA) of a virtual read/ write request from a network computing element 101 to forward the virtual read/write request to the appropriate virtual storage volume 106.

In doing so, information may be collected by a PSC 105. For example, a PSC 105 selected by the SVE 103 for forwarding the read/write requests may determine a virtual initiator port ID, a physical target port, a physical LUN, and an offset into that LUN to provide access to a particular virtual storage volume 106 by a particular network computing element 101. The virtual read/write request referenced by the target port 102 and the virtual LBA are thereby mapped to a particular physical path and thus to the physical extents (i.e., the virtual storage volumes 106-1 . . . N) of the physical storage volume.

The metadata maps may be used to distribute the forwarded read/write request load by linking different PSCs 105 that reference the same physical storage space to different map entries. In other words, the maps may be configured to handle a certain number of read/write requests. For example, each physical extent may be described by a set of PSCs 105-1 . . . N which represent one or more available paths to the physical storage volume 107. At the time of creation of the metadata for a particular virtual volume 106, a virtual extent 204 within the SVE 203 maps to one of the available PSCs 105-1 . . . N for access to the physical storage volume 107. Mapping of a virtual volume as indexed by the LBA of the read/write request may be used to statically select one path from a set of available paths (i.e., PSCs 105-1 . . . N). To do so, the assignment of available paths to map entries may be made using a pre-defined policy that accounts for resource differences, such as path speed.

More specifically, the maps may index a virtual LBA to a physical LBA. Each such mapping is generally one-to-one and the SVE 203 populates these maps such that the set of PSCs 105-1 . . . N to the virtual volumes 106-1 . . . N are used, and not just according to a preferred path. The distribution of the mappings may be, in one embodiment, weighted according to the usage of the available paths. For example, if there are four PSCs 105 to a given physical volume, then an even distribution assigns 25% of the mappings to each of the available PSCs 105. A weighted distribution, on the other hand, may take into account the fact that one or more of these paths are higher speed, employ fewer network hops, etc. Such a weighting is generally predetermined; but for a given read/write request, the request maps to the same PSC 105 in all instances. For example, if a host computer sends the same read/write request to the same virtual LBA, then every other read/write request from that host computer also maps to the same PSC such that there is no complex algorithmic distribution or balancing to diminish request processing.

In operation, a network computing element 101 may transfer a virtual read/write request according to a specific storage access command being used by the network computing element 101. Examples of such commands include Fibre Channel, SAS, TCP/IP, SCSI, and ISCSI. For example, the network computing element 101-1 may transfer a Fibre Channel command that includes a physical initiator ID (S_ID), a virtual target ID (D_ID), a virtual LUN to access the virtual storage volume 106-1, and an offset into that LUN (the LBA). The network computing element 101-1 transfers the virtual read/write request to the target port 102-1. The target port 102-1 links the virtual read/write request to the SVE 203 via the virtual LBA to map the read/write request to the virtual storage volume 106-1. In doing so, the SVE 203 determines from the virtual LBA which virtual extent 204 is to be used. As an example, the SVE 203 may select the virtual extent 204-1 based on the virtual LBA to select the path to the physical storage volume 107 via the physical storage container 105-1, thereby accessing the physical storage volume 107 through the virtual storage volume 106-1.

Figure 3:
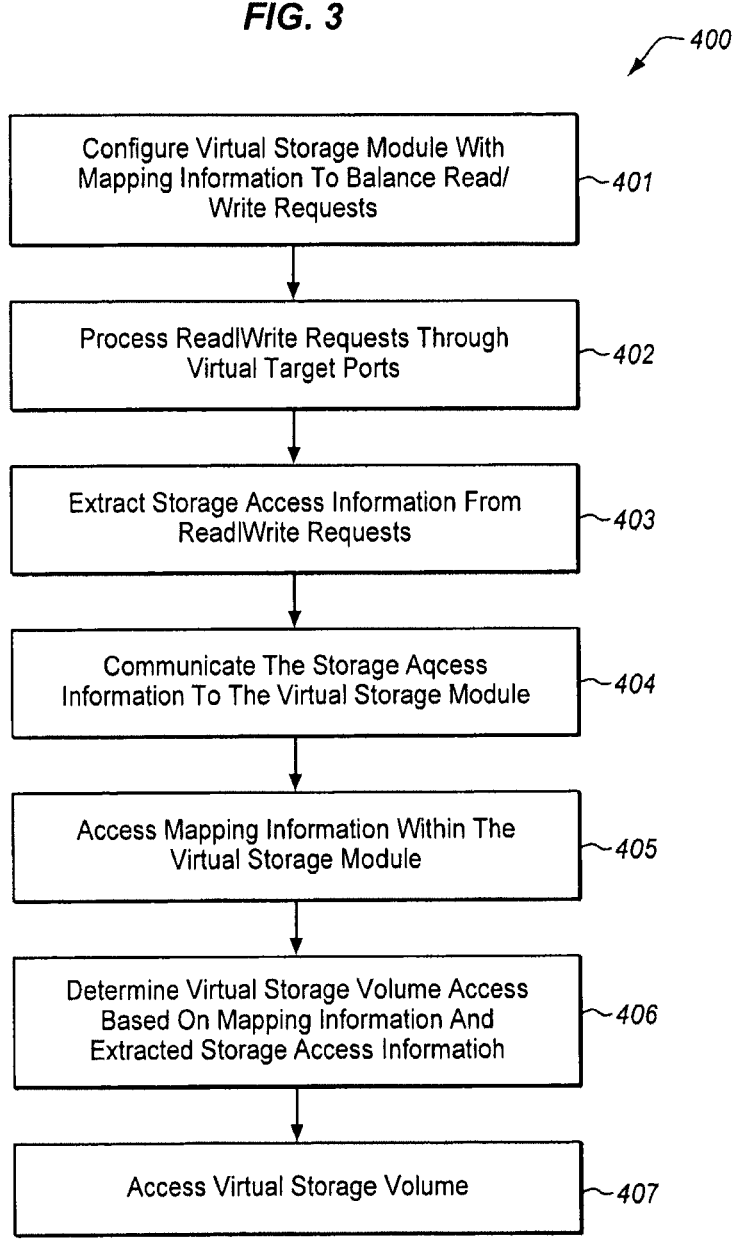
FIG. 3 is a flowchart of an exemplary process for load balancing read/write requests in a virtualized storage system.

FIG. 3 is a flowchart of an exemplary process 400 for load balancing read/write requests in a virtualized storage system. In this embodiment, a virtual storage module, such as the SVE 203 of FIG. 2, is configured with mapping information that is used to balance read/write requests coming from network computing elements that are coupled to a communication network, in the process element 401. For example, the virtual storage module may include a plurality of maps with each map designating a virtual storage volume that a read/write request is to access and the actual path in which that access is to occur. The number of read/write requests across any particular path to the physical storage volume may be configured with the mapping information so as to balance the read/write requests across the physical paths. In other words, each path to the physical storage volume may be configured to handle a certain number of read/write requests over a certain period of time. Such determinations may be configured with the maps of the virtual storage module based on certain characteristics of the physical paths (e.g., path speed capability, requests to a particular physical storage location, etc.).

With this in mind, a host computer may be coupled to a communication network, such as the Internet, to access a virtualized storage system. The host computer may access the virtualized storage system by sending a virtual read/write request to the virtualized storage system either directly or through some other initiator device (e.g., a network computing element 101). Information in the virtual rewrite request may be used to index a particular map within the virtual storage module. For example, virtual target ports may process the read/write requests in the process element 402 and extract storage access information from those requests in the process element 403. The virtual target ports may then communicate this storage access information to the virtual storage module in the process element 404. The virtual storage module thereby accesses the mapping information (e.g., the virtual extents 204-1 . . . N) in the process element 405 and determines the virtual storage volume access based on the selected mapping information in the extracted storage access information in the process element 406. For example, a virtual storage volume may use the mapping information and the extracted storage access information to select a particular physical path to the virtual storage volume to thereby access the virtual storage volume (and the physical storage volume) in the process element 407.

Figure 4:
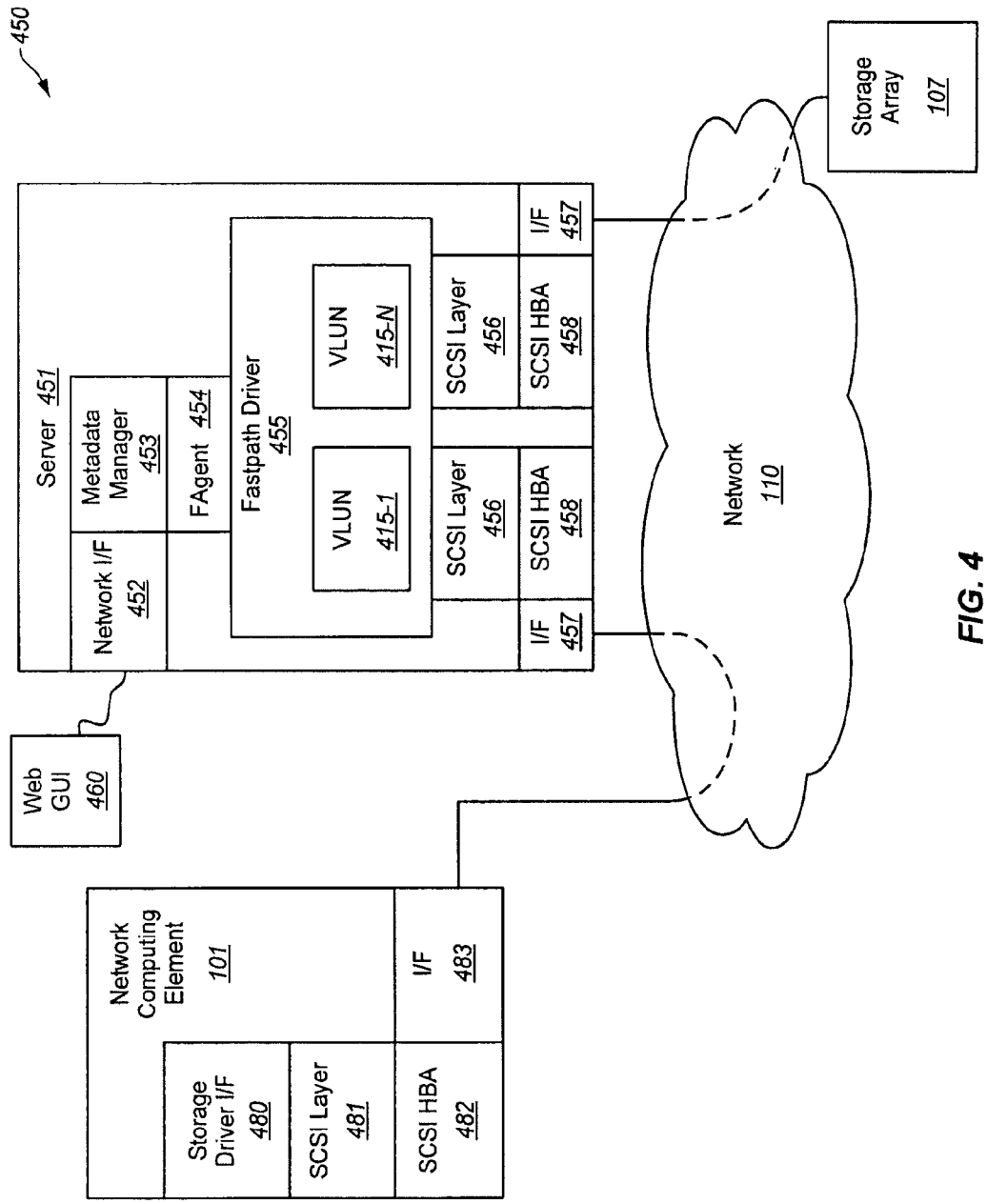
FIG. 4 is a block diagram of an exemplary network-based storage virtualization system.
Figure 5:
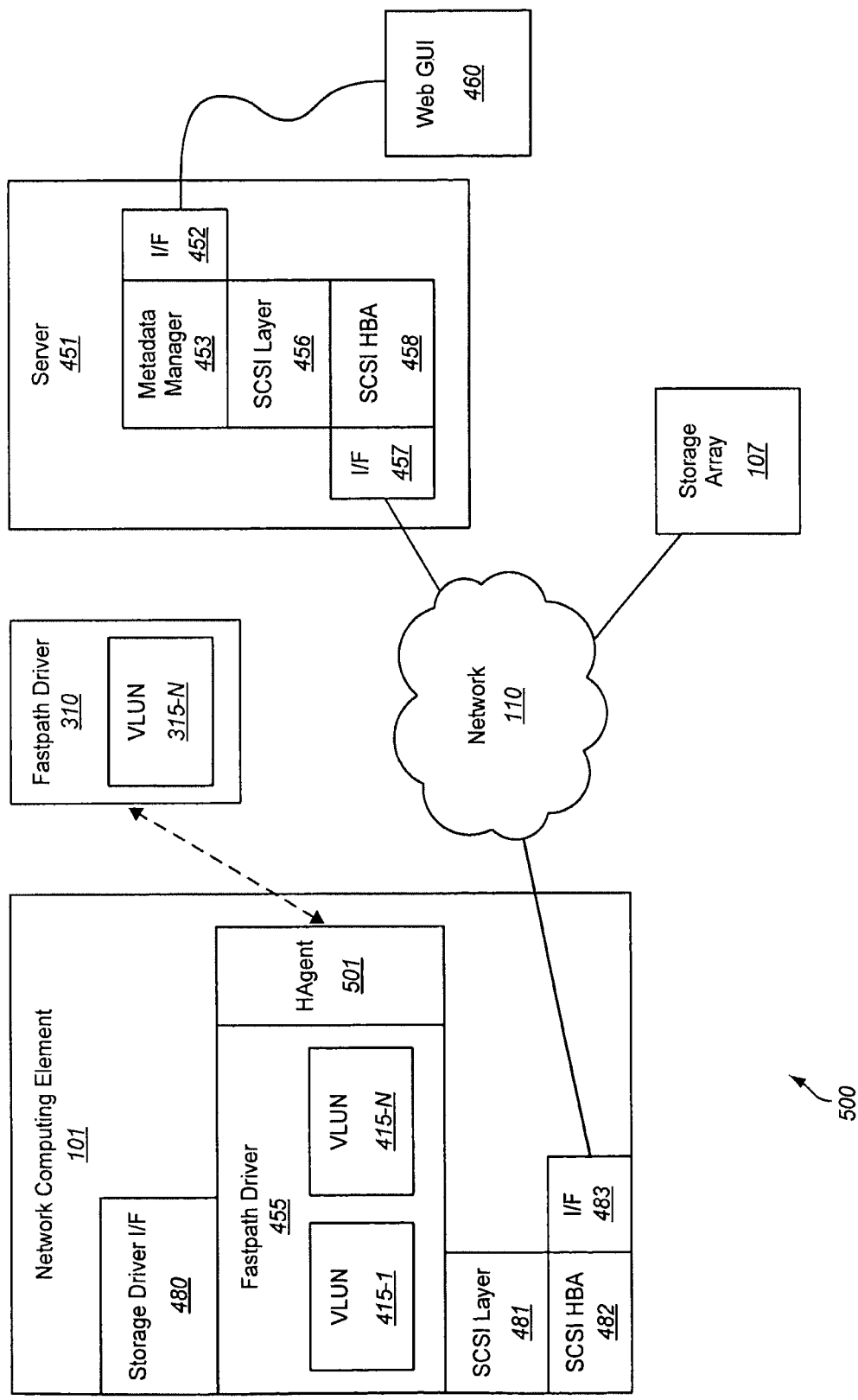
FIG. 5 is a block diagram of another exemplary network-based storage virtualization system.
Figure 6:
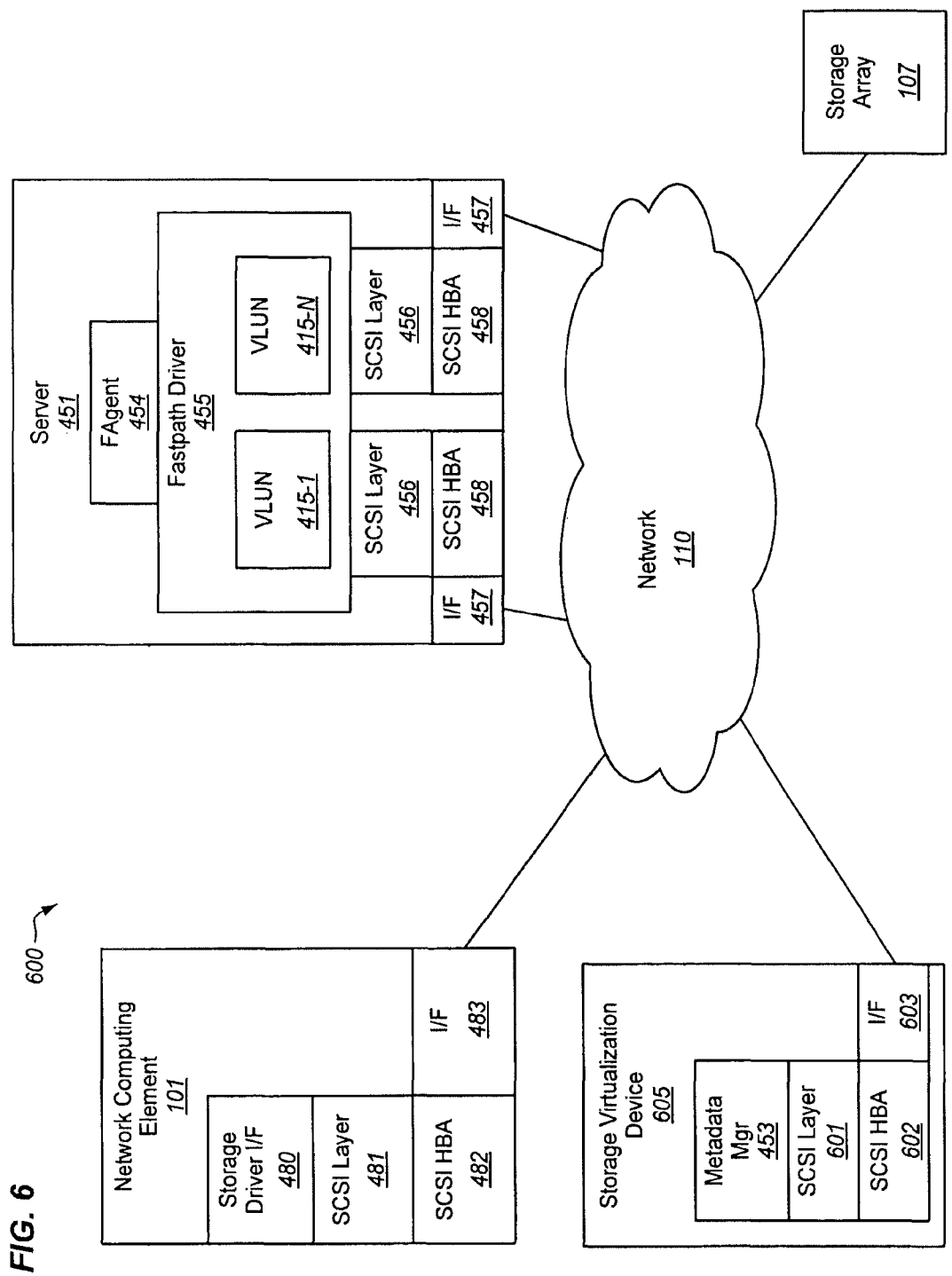
FIG. 6 is a block diagram of another exemplary network-based storage virtualization system.

FIGS. 4-6 illustrate various embodiments in which the storage virtualization load balancing described above may be implemented within a network. For example, FIG. 4 is a block diagram of an exemplary network-based storage virtualization system 450, which performs storage virtualization across the network 110 using a "Storage Fabric" Agent (FAgent 454). The system 450 includes a server system 451 that includes various modules operable to perform storage virtualization. The modules herein are generally configured as software and firmware modules operable with an operating system environment of the server 451. For example, the operating system of the server system 451 may be configured with SCSI host bus adapter (HBA) modules 458 that allow a user to control various hardware components of the physical server system 450 via the SCSI protocol. Through storage virtualization, the server system 451 may view a physical storage system as a single contiguous storage space (e.g., like a disk drive). In this regard, the server system 451 may also include SCSI layers 456 to provide access to the virtualized storage space from the SCSI HBA module 458 via a FastPath driver 455 (produced by LSI Corporation of Milpitas, Calif.).

For example, a user may send a read/write request to the server system 451 from a network computing element 101. In doing so, the network computing element 101 may configure the read/write request as a virtual read/write request via the storage driver interface 480, a SCSI layer 481, and a SCSI HBA 482. The read/write request is then transferred to the SCSI HBA 458 of the server system 451 via the communication interface 483 of the network computing element 101 and the communication interface 457 of the server system 451. The server system 451 may process the request through the SCSI HBA modules 458 and, through the SCSI layers 456. The FastPath driver 455 may then provide access to the physical storage array 107 via the virtualization LUN tables 415-1 ... N (i.e., the LUN designations of the virtual storage volumes 106) across the network 110. In this regard, the FastPath driver 455 may operate as an SVE (e.g., SVE 203) that also allows a user to store data within the physical storage array 107 as though it were a single contiguous storage space. The FastPath driver 455 is also generally responsible for the discovery of storage area network (SAN) objects. For example, the FastPath driver 455 may detect additions or changes to the storage system and alter I/O maps to ensure that the physical storage array 107 appears as a single storage element.

In such a FastPath environment, the server system 405 may also include a metadata manager 453 (e.g., a component of the SVE 203) and the FAgent 454 also produced by LSI Corporation of Milpitas, Calif.) to configure/provide mappings of the FastPath driver 455 to access the storage array 107. For example, an administrator may communicate to the server system 451 via a web based graphical user interface (GUI) 460 that is communicatively coupled to the server system 451 via the network interface 452 to generate storage virtualization maps via the metadata manager 453. The maps are then administered by the FastPath driver 455 via the FAgent 454.

FIG. 5 is a block diagram of another exemplary network-based storage virtualization system 500 in which the storage virtualization is implemented with the network computing element 101. For example, the network computing element 101 may be configured with the FastPath driver 455 that provides the virtual LUNs 415-1 ... N to a user via the storage driver interface 480. More specifically, the network computing element 101 may also include a FastPath Host Agent (HAgent) 501 that accesses a particular virtual LUN (e.g., virtual LUN 415-N) designated for the user of the network computing element 101 and presents that virtual LUN to the user via the storage driver interface 480. The FastPath driver 455, in this embodiment, accesses the physical storage array 107 by configuring virtual read/write requests and transferring those requests to the server 451 over the network 110. The server 451 in turn processes each virtual rewrite requests and accesses the storage of the storage array 107 according to the maps provided by the metadata manager 453 (i.e., in the load balanced manners described above).

FIG. 6 is a block diagram of another exemplary network-based storage virtualization system in which the storage virtualization (e.g., the mappings from the network computing elements 101-1 ... N) is implemented with an external storage virtualization device 605. In this embodiment, the network computing element 101 may configure a read/write request for access to the storage array 107 and transfer that request to the server 451. The FastPath driver 455 may access a particular virtual LUN based on the read/write request and transfer the information to the storage virtualization device 605 for mapping the request to the storage array 107 in a load balanced fashion as described above. In this regard, the storage virtualization device 605 may identify the route of the request via the metadata manager 453 and transfer that information back to the server 451 such that it may access the storage array 107 according to that mapping. This embodiment provides the advantages of having metadata maps remotely configured and compartmented (i.e., organized) while remaining accessible from the server 451 over the network 110.

Advantages of the above embodiments include providing decision logic for determining utilization of available paths in a network virtualization device at the creation time of a virtual storage volume. Once the mappings have been determined, host access patterns may more naturally flow through the metadata and traverse appropriate paths to the physical storage array 107. The lack of dynamic read/write decisions of network paths results in higher performance, lower software overhead, and lower resource utilization.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage module comprising:
   one or more ports configured to couple the storage module to one or more computing elements via a network; and
   one or more maps, each of the one or more maps associating a plurality of logical block addresses with a respective virtual extent and a preassigned route through the network to a respective physical storage device, the preassigned route being selected from a plurality of routes between the storage module and the respective physical storage device;
   wherein the storage module is configured to:
      receive a first storage request from one of the computing elements, the first storage request including a first logical block address;
      determine a first virtual extent based on the first logical block address and the one or more maps;
      determine a first preassigned route between the storage module and a first physical storage device storing the first virtual extent based on the first logical block address and the one or more maps; and
      forward the first storage request to the first physical storage device using the first preassigned route;
   wherein each of the one or more maps balances distribution of storage requests among preassigned routes.

2. The storage module of claim 1 wherein the virtual extents vary in size.

3. The storage module of claim 1 wherein the virtual extents are indexed by the logical block addresses.

4. The storage module of claim 3 wherein the virtual extents create a contiguous storage space.

5. The storage module of claim 1 wherein the one or more maps provide a one-to-one mapping between logical block addresses and physical block addresses on the physical storage devices.

6. The storage module of claim 1 wherein the first physical storage device includes one or more disk drives.

7. The storage module of claim 1 wherein the storage module is further configured to determine a communication type of the first storage request and process the first storage request according to the communication type, the communication type being selected from a group consisting of Fibre Channel, SAS, TCP/IP, SCSI, iSCSI, and SCSI over Infiniband.

8. The storage module of claim 1 wherein the balancing of the distributions comprises a weighted balancing based on network resources utilized by the preassigned routes, the network resources including one or more items selected from a group consisting of path speed and numbers of network hops.

9. The storage module of claim 1 wherein the balancing of the distributions comprises each of the preassigned routes handling a predetermined number of storage requests.

10. A method of balancing storage requests within a virtualized storage system, wherein the virtualized storage system includes a storage module that is configured to present a plurality of remotely located physical storage devices as a plurality of virtual storage volumes, the method comprising:
receiving a storage request from a computing element, the storage request including a logical block address;
determining a first virtual extent based on the logical block address and one or more maps;
determining a preassigned route through a network between the storage module and a first physical storage device storing the first virtual extent, the preassigned route being selected from among a plurality of routes through the network between the storage module and the first physical storage device;
forwarding the storage request to the first physical storage device using the preassigned route; and
balancing distribution of storage requests by having each of the one or more maps handle a predetermined number of storage requests.

11. The method of claim 10, further comprising:
determining a communication type of the storage request; and
processing the storage request according to the communication type;
wherein the communication type is selected from a group consisting of Fibre Channel, SAS, TCP/IP, SCSI, iSCSI, and SCSI over Infiniband.

12. The method of claim 10 wherein the balancing of the distributions comprises a weighted balancing based on network resources utilized by the preassigned route, wherein the network resources include one or more items selected from a group consisting of path speed and numbers of network hops.

13. The method of claim 10 wherein the virtual storage volumes comprise a plurality of virtual extents that vary in size.

14. The method of claim 10 wherein the virtual storage volumes comprise a plurality of virtual extents that create a contiguous storage space.

15. A storage system comprising:
a plurality of storage units; and
a storage controller configured to be coupled to the storage units using a network, the storage controller comprising one or more maps, each of the one or more maps associating a plurality of logical block addresses with a respective virtual extent and a preassigned route through the network to a respective one of the plurality of units, the preassigned route being selected from a plurality of routes between the storage module and the respective one of the plurality of storage units;
wherein the storage controller is configured to:
receive a first storage request from a computing device over the network, the first storage request including a first logical block address;
determine a first virtual extent based on the first logical block address and the one or more maps;
determine a first preassigned route between the storage module and a first storage unit storing the first virtual extent based on the first logical block address and the one or more maps; and
forward the first storage request to the first storage unit over the network using the first preassigned route;
wherein each of the one or more maps balances distribution of storage requests by handling a predetermined number of storage requests.

16. The storage system of claim 15 wherein the virtual extents vary in size.

17. The storage system of claim 15 wherein the storage controller is further configured to:
determine a communication type of the first storage request and process the first storage request according to the communication type;
wherein the communication type is selected from a group consisting of Fibre Channel, SAS, TCP/IP, SCSI, iSCSI, and SCSI over Infiniband.

18. The storage system of claim 15 wherein the balancing of the distributions comprises a weighted balancing based on network resources utilized by the preassigned routes, the network resources including one or more items selected from a group consisting of path speed and numbers of network hops.

* * * * *